US012297793B1

(12) United States Patent
Martin et al.

(10) Patent No.: US 12,297,793 B1
(45) Date of Patent: May 13, 2025

(54) HYDROGEN CAPTURE CANISTER

(71) Applicant: PHINIA Delphi Luxembourg SARL, Belvaux (LU)

(72) Inventors: Thomas Rodrigues Martin, Troy, MI (US); Mathieu Da Graca, Blois (FR)

(73) Assignee: PHINIA DELPHI LUXEMBOURG SARL, Belvaux (LU)

(*) Notice: Subject to any disclaimer, the term of this patent is extended or adjusted under 35 U.S.C. 154(b) by 0 days.

(21) Appl. No.: 18/388,367

(22) Filed: Nov. 9, 2023

(51) Int. Cl.
*F02M 21/02* (2006.01)
*F02D 19/02* (2006.01)

(52) U.S. Cl.
CPC ....... *F02M 21/0293* (2013.01); *F02D 19/025* (2013.01); *F02D 19/027* (2013.01); *F02M 21/0206* (2013.01); *F02M 21/023* (2013.01)

(58) Field of Classification Search
CPC ......... Y02T 10/30; Y02T 10/12; Y02T 90/40; Y02E 60/36; Y02E 60/32; Y02E 60/34; F02M 21/0206; F02M 25/12; F02M 25/10; F02M 21/0221; F02M 21/0293; F02D 41/0027; F02D 19/0644; F02D 41/0025; F02D 19/0678; F02B 2043/106; F02B 43/10
See application file for complete search history.

(56) References Cited

U.S. PATENT DOCUMENTS 7,117,830 B1 10/2006 Boyer et al.
7,308,889 B2 12/2007 Post et al.
(Continued)

FOREIGN PATENT DOCUMENTS

CN 203488281 U * 3/2014
CN 109599576 A 4/2019
(Continued)

OTHER PUBLICATIONS

Rocha et al., "Experimental investigation of hydrogen addition in the intake air of compressed ignition engines running on biodiesel blend", International Journal of Hydrogen Energy, (2016) found at: http://dx.doi:10.1016/j.ijhydene.2016.11.032.

*Primary Examiner* — George C Jin
*Assistant Examiner* — Teuta B Holbrook
(74) *Attorney, Agent, or Firm* — WARNER NORCROSS + JUDD LLP

(57) ABSTRACT

A hydrogen management system for capturing residual hydrogen in a hydrogen supply line of an internal combustion engine and metering the captured hydrogen back into the internal combustion engine is provided. The hydrogen management system comprises a hydrogen capture cannister, an input valve, a pressure sensor, and an output valve. The hydrogen capture cannister defines a chamber for storing the captured hydrogen and the pressure sensor monitors pressure within the chamber. The input valve is in fluidic communication with the hydrogen supply line and the chamber. The output valve is in fluidic communication with the chamber and the internal combustion engine. The controller is in electronic communication with the input valve, the pressure sensor, the output valve, and an engine control unit, and is configured to provide metering instructions to the output valve based on electronic communications with the engine control unit and the pressure sensor.

20 Claims, 5 Drawing Sheets

(56) References Cited

U.S. PATENT DOCUMENTS

| | | | | |
|---|---|---|---|---|
| 8,396,644 | B2 * | 3/2013 | Kabashima | F02M 25/10 123/436 |
| 2006/0137332 | A1 | 6/2006 | Allgeier et al. | |
| 2010/0012090 | A1 | 1/2010 | Lewis, III | |
| 2023/0012227 | A1 | 1/2023 | Simon et al. | |

FOREIGN PATENT DOCUMENTS

| | | | | | |
|---|---|---|---|---|---|
| CN | 112397745 | A | * | 2/2021 | B60L 58/32 |
| CN | 115370509 | A | * | 11/2022 | |
| CN | 116161619 | A | * | 5/2023 | |
| CN | 219492427 | U | * | 8/2023 | |
| CN | 116677517 | A | * | 9/2023 | |
| CN | 116753089 | A | * | 9/2023 | |
| CN | 116816521 | A | * | 9/2023 | |
| CN | 115234406 | B | * | 5/2024 | F02D 19/021 |
| DE | 102015217069 | A1 | | 3/2017 | |
| FR | 3017442 | A1 | * | 8/2015 | F17C 1/06 |
| JP | 2006226170 | A | * | 8/2006 | F02D 41/0025 |
| JP | 2007327380 | A | * | 12/2007 | |
| JP | 4424217 | B2 | | 3/2010 | |
| JP | 2023003673 | A | * | 1/2023 | |
| WO | 2020164789 | A1 | | 8/2020 | |
| WO | 2022189054 | A1 | | 9/2022 | |
| WO | 2023016742 | A1 | | 2/2023 | |

* cited by examiner

HYDROGEN CAPTURE CANISTER

FIELD OF THE INVENTION

The disclosure generally relates to management of hydrogen in automotive vehicles.

BACKGROUND OF THE INVENTION

Hydrogen is considered an excellent clean fuel with potential applications in several fields, including transportation. Hydrogen has some important physical properties. Namely, hydrogen is combustible and difficult to contain. Hydrogen is hard to contain because it is a small atom and forms a small diatomic molecule, $H_2$. As such, hydrogen can escape confinement in the fuel systems of motor vehicles powered by internal combustion engines. Once free, hydrogen emissions can pose potential safety, environmental, and efficiency issues.

A safety concern with gaseous hydrogen is its combustibility. The combustion properties of hydrogen, such as its wide range of flammability, low minimum ignition energy, and high burning velocity, make it an excellent alternative fuel. However, due to these properties, there are various safety concerns associated with hydrogen storage, utilization, and release in vehicles. From a combustion perspective, hydrogen gas can burn in a flame, ignite as it is mixing in air in a flash fire, or can mix with air and explode via deflagration or detonation. Generally, the higher volume concentration of hydrogen in the air, the lower the ignition energy required, and the more severe the resulting combustion event.

From an environmental perspective, although hydrogen itself emits no carbon dioxide when burned or used in a fuel cell, hydrogen can, when emitted into the atmosphere, contribute to climate change by increasing the amounts of other greenhouse gases such as methane, ozone, and water vapor.

Finally, from an efficiency perspective, hydrogen that escapes confinement in the fuel systems of motor vehicles cannot be converted into energy, and renders vehicles less efficient.

Accordingly, various authorities world-wide are considering maximum hydrogen emission standards for motor vehicles in an effort to curb hydrogen emissions.

To this end, there is a need for hydrogen management in vehicles. In particular, hydrogen management systems that safely capture hydrogen, and prevent hydrogen emissions. Preferably, such hydrogen management systems would safely store and reintroduce the captured hydrogen to fuel the internal combustion engine.

BRIEF SUMMARY

A hydrogen management system for capturing residual hydrogen in a hydrogen supply line of an internal combustion engine and metering the captured hydrogen back into the internal combustion engine is disclosed herein. The hydrogen management system comprises a hydrogen capture cannister, an input valve, a pressure sensor, and an output valve. The hydrogen capture cannister defines a chamber for storing the captured hydrogen and the pressure sensor monitors pressure within the chamber. The input valve is in fluidic communication with the hydrogen supply line and the chamber and is configured to transfer residual hydrogen from the hydrogen supply line to the chamber of the hydrogen capture cannister. The output valve is in fluidic communication with the chamber of the hydrogen capture cannister and the internal combustion engine. The controller is in electronic communication with the input valve, the pressure sensor, the output valve, and an engine control unit of the internal combustion engine, and is configured to provide metering instructions to the output valve based on electronic communications with the engine control unit and the pressure sensor.

In specific embodiments, the metering instructions are determined by a pressure differential between a combustion pressure of the internal combustion engine and an HCC pressure of the hydrogen capture cannister. In some such embodiments, the pressure differential is between a pressure of an intake manifold of the internal combustion engine and a pressure of the hydrogen capture cannister of the hydrogen management system. In other such embodiments, the pressure differential is between a pressure of a throttle valve of a turbocharger of the internal combustion engine and a pressure of the hydrogen capture cannister of the hydrogen capture cannister.

In some specific embodiments, the output valve is a port fuel injector that maintains a hydrogen concentration of less than 4%, based on 100 parts by volume gaseous intake. In various examples, the port fuel injector is configured to maintain a hydrogen concentration from about 0.1 to 4%, based on 100 parts by volume gaseous intake.

A method of hydrogen management in an internal combustion engine is also disclosed. The method involves capturing residual hydrogen in a hydrogen supply line of the internal combustion engine and metering the captured hydrogen back into the internal combustion engine with a hydrogen management system. The hydrogen management system comprises an input valve, a hydrogen capture cannister, a pressure sensor, a pressure relief valve, an output valve, and a controller. The method includes the steps of fluidly connecting the hydrogen supply line and the hydrogen capture cannister when the internal combustion engine is shut off and then transferring hydrogen from the hydrogen supply line to the hydrogen capture cannister. The captured hydrogen is stored in the hydrogen capture cannister. The method also includes the step of metering the captured hydrogen into the internal combustion engine via port fuel injection when the internal combustion engine is running. The controller is in electronic communication with the input valve, the pressure sensor, the output valve, and an engine control unit, and is configured to provide metering instructions to the output valve based on electronic communications with the engine control unit and the pressure sensor.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A hydrogen management system for capturing residual hydrogen in a hydrogen supply line, e.g. a fuel supply, line of a hydrogen utilizing apparatus, e.g. an internal combustion engine, and metering the captured hydrogen back into the hydrogen utilizing apparatus is disclosed and described herein. Although the hydrogen management system described herein is utilized in a vehicle, and in particular with an internal combustion engine, it should be appreciated that hydrogen is considered a clean fuel with potential applications in several fields other than transportation. Further, the challenges related to handling and consumption of hydrogen due to its molecular size, combustibility, and other properties are challenges that must be overcome in these other fields. To this end, the hydrogen management system is for capturing residual hydrogen in a hydrogen supply line of a hydrogen utilizing apparatus and metering the captured hydrogen back into the hydrogen utilizing apparatus in many different applications and is not limited to use in vehicular internal combustion engine applications. For Example, the hydrogen management system can be utilized in a hydrogen vehicle to feed the fuel cell stack, for which hydrogen capture could be applied.

Figure 1:
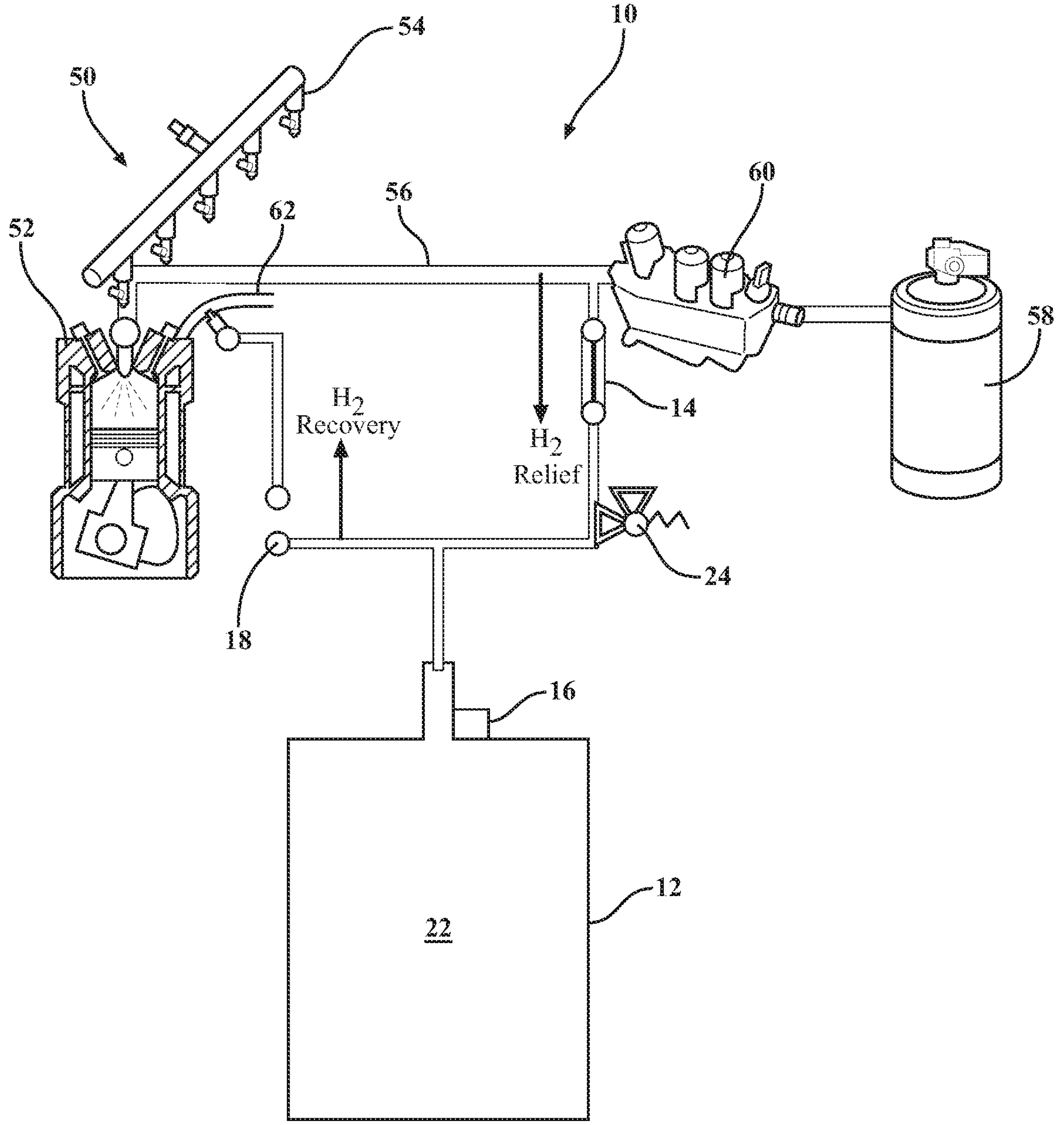
FIG. 1 is a schematic diagram of an embodiment of a hydrogen management system for capturing residual hydrogen in a hydrogen supply line of an internal combustion engine and reusing the captured hydrogen to fuel the internal combustion engine.
Figure 2:
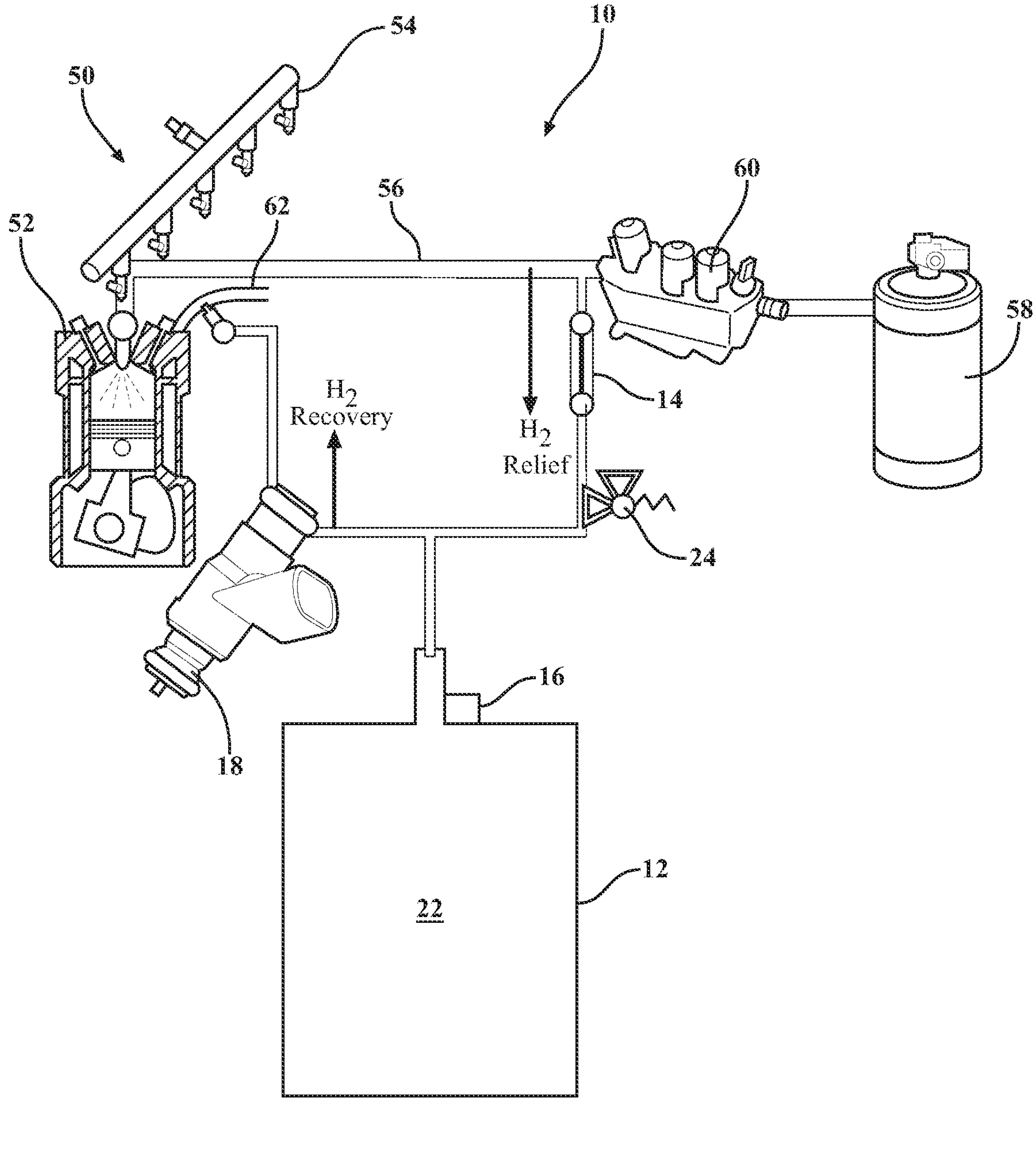
FIG. 2 is a schematic diagram of another embodiment of a hydrogen management system for capturing residual hydrogen in a hydrogen supply line of an internal combustion engine and metering the captured hydrogen into the internal combustion engine as fuel.

Referring to FIGS. 1 and 2, wherein like numerals indicate corresponding parts throughout the several views, the hydrogen management system is illustrated and generally designated at 10. By way of example, an internal combustion engine 50 including a combustion apparatus 52 and a fuel rail 54 for supplying fuel thereto is illustrated. The internal combustion engine 50 also includes a hydrogen supply line 56 for transporting hydrogen from a hydrogen storage tank 58 to the combustion apparatus 52 by way of the fuel rail 54. Hydrogen is withdrawn from the hydrogen storage tank 58 with a hydrogen regulation module 60.

The hydrogen management system 10 is designed to capture hydrogen in the hydrogen supply line 56 of the internal combustion engine 50 that remains in the hydrogen supply line 56, referred to herein as residual hydrogen, when the internal combustion engine 50 is idle and/or shut off. At a later time, when the internal combustion engine 50 is running, the hydrogen management system 10 meters the captured hydrogen back into the internal combustion engine 50. Generally, the hydrogen management system comprises a hydrogen capture cannister 12, an input valve 14, a pressure sensor 16, an output valve 18, and a controller 20. The hydrogen capture cannister 12 defines a chamber 22 for storing the captured hydrogen and the pressure sensor 16 monitors pressure within the chamber 22. The input valve 14 is in fluidic communication with the hydrogen supply line 56 and the chamber 22 and is configured to transfer residual hydrogen from the hydrogen supply line 56 to the chamber 22 of the hydrogen capture cannister 12. The output valve 18 is in fluidic communication with the chamber 22 of the hydrogen capture cannister 12 and the internal combustion engine 50. The controller 20 is in electronic communication with the input valve 14, the pressure sensor 16, the output valve 18, and an engine control unit (not illustrated) of the internal combustion engine 50. The controller 20 is configured to provide metering instructions to the output valve 18 based on electronic communications with the engine control unit and the pressure sensor 16.

FIGS. 1 and 2 are schematic diagrams generally depicting the hydrogen management system 10. In FIG. 1, the hydrogen management system 10 is illustrated. When the internal combustion engine 50 is shut-off, hydrogen remains in the hydrogen supply line 56 and fuel rail 54. At this juncture, the controller 20 is in electronic communication with the input valve, which, as instructed by the controller, opens, and removes or purges the hydrogen from the hydrogen supply line 56 and transfers the hydrogen to the carbon capture cannister 12. This movement is illustrated with the arrow indicating "$H_2$ relief." The captured hydrogen is then stored in the hydrogen capture cannister 12. Once the internal combustion engine is running, the captured hydrogen is metered back into the internal combustion engine via port fuel injection. This movement is illustrated with the arrow indicating "$H_2$ recovery." In FIG. 1, the output valve 18 is a solenoid valve. In FIG. 2, the output valve 18 is a port fuel injector including both a solenoid valve and a metering valve.

Figure 3:
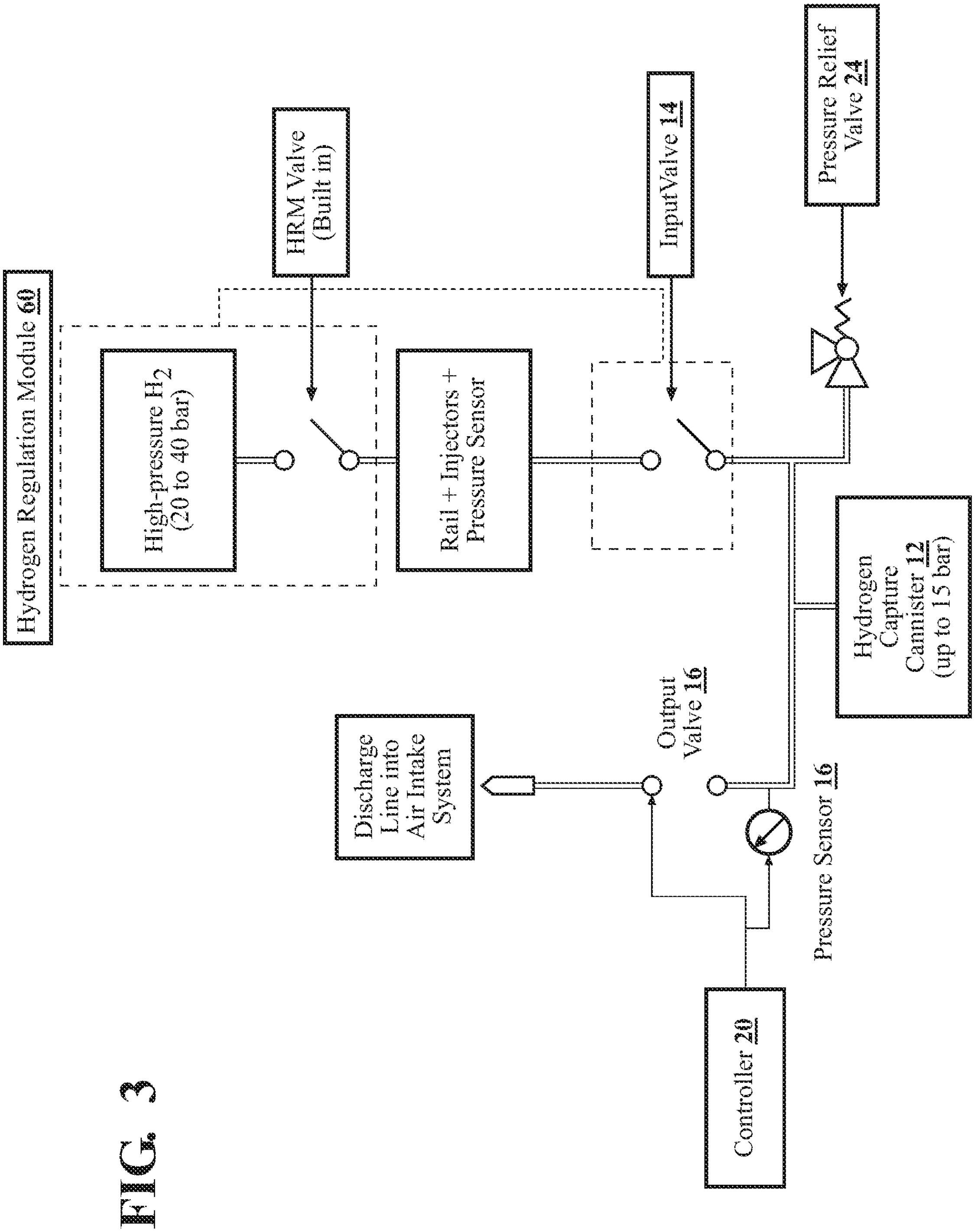
FIG. 3 is a schematic diagram further illustrating hydrogen management with the hydrogen management system of FIG. 1.
Figure 4:
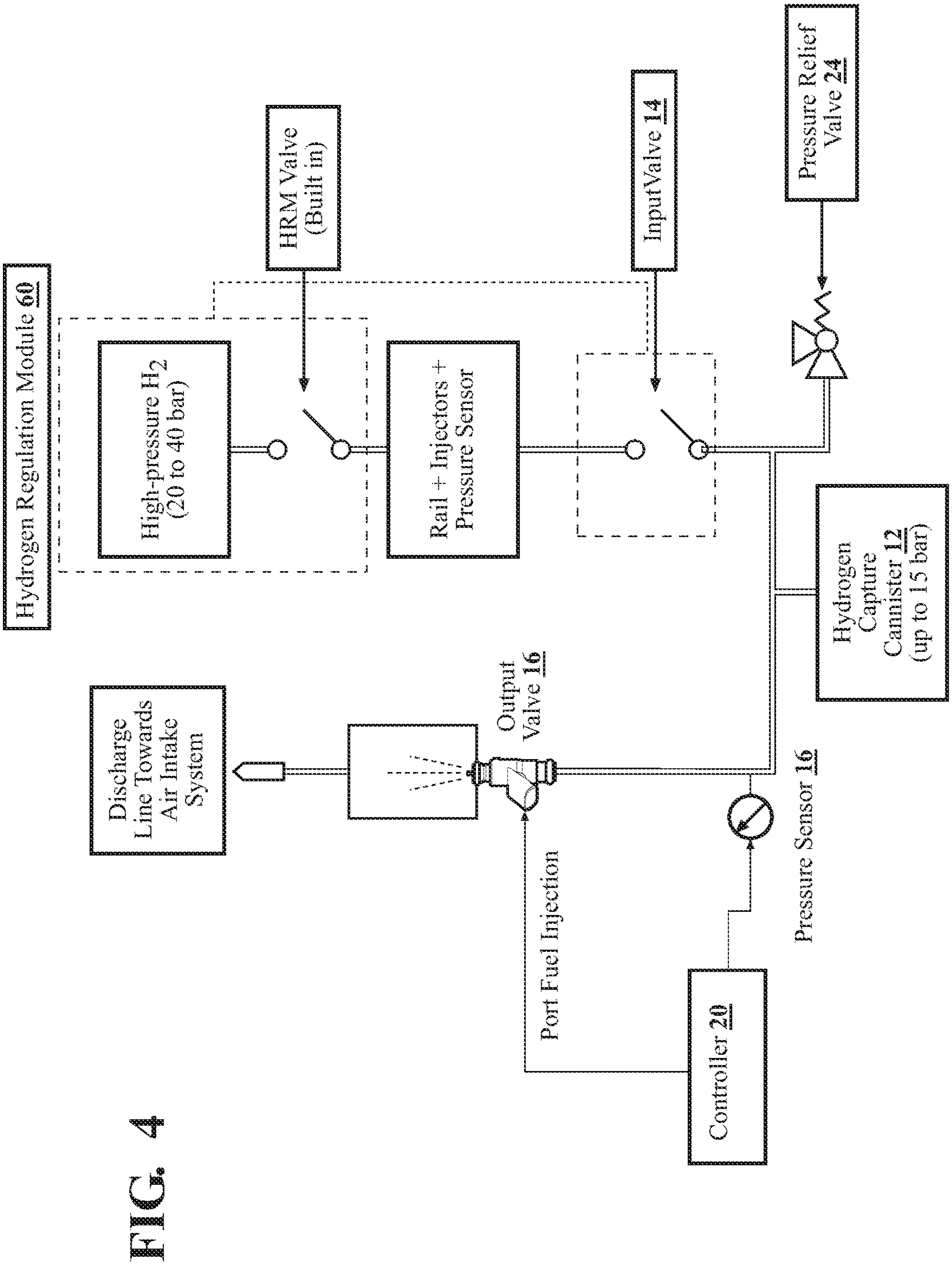
FIG. 4 is a schematic diagram further illustrating hydrogen management with the hydrogen management system of FIG. 2.

The controller is in electronic communication with the input valve 14, the pressure sensor 16, the output valve 18, and the engine control unit (not illustrated), and is configured to provide metering instructions to the output valve based on electronic communications with the engine control unit and the pressure sensor. With reference now to FIGS. 3 and 4, the controller activates the input valve 14, which opens and transfers residual hydrogen in the hydrogen supply line 56 and fuel rail 54 to the hydrogen capture cannister 12 and stores the hydrogen for later use. Generally, the controller activates the input valve 14 when the internal combustion engine is not in use. Removal of the residual hydrogen prevents escape of the hydrogen into the atmosphere and also mitigates the risk associated with hydrogen combustion.

Still referring to FIGS. 3 and 4, the controller, which is in electronic communication with the engine control unit (not illustrated) of the internal combustion engine 50, activates the output valve 18, based on a pressure measured at the air intake of the combustion apparatus 52 and an HCC pressure as measured by the pressure sensor 16. Accordingly, hydrogen can be metered out a precise time and in a precise amount. From a timing perspective, the hydrogen is discharged to allow the hydrogen to mix with the air as it moves through an air intake apparatus 62. In some embodiments, the air intake apparatus 62 is an intake manifold. In these embodiments, the pressure differential is between a pressure of an intake manifold of the internal combustion engine 50 and an HCC pressure of the hydrogen capture cannister 12 of the hydrogen management system 10. In other embodiments, the air intake apparatus 62 is a throttle valve of a turbocharger. In these embodiments, the pressure differential is between a pressure of a throttle valve of a turbocharger of the internal combustion engine 50 and an HCC pressure of the hydrogen capture cannister 12 of the hydrogen management system 10. By timing the release of the hydrogen, hydrogen loss is minimized (because the hydrogen is immediately sucked into the combustion apparatus 52) and hydrogen combustion is maximized. Further, from a safety perspective, combustion in the air intake apparatus 62 can be further avoided by releasing hydrogen into the air intake apparatus 62 in an amount of less than 4% by volume based on 100 parts by volume gaseous intake. In some embodiments, the port fuel injector can release hydrogen into the air intake apparatus 62 at a concentration from about 0.1 to 4%, based on 100 parts by volume gaseous intake. Without being bound by theory, it is believed that port injection of the hydrogen provides an even mixture of hydrogen and air, which can optimize the combustion process.

It should be appreciated that, in various applications, including but not limited to applications in internal combustion engines described herein, the hydrogen management system 10 can be configured so that the output valve 18 returns hydrogen in an amount of from 0.1 to 100% at various times and at various rates as it returns the captured hydrogen to different hydrogen utilizing apparatuses. That is, the hydrogen concentration and rate of return can be varied as required by the particular application.

Generally, the input valve 14, the output valve 18, and the pressure relief valve 24 included in the hydrogen management system 10 are in electronic communication with the controller 20. In many embodiments, these valves are solenoid valves that are controlled via the controller 20. The solenoid valves employed for these elements are used as control elements in the hydrogen management system 10 and can be configured to purge, release, mix (e.g. with air), dose, and distribute the hydrogen. These valves are selected to provide reliability, extended service life, low control power use, and compact design. If used, the solenoid valves may differ in the characteristics of the electric current they use, the strength of the magnetic field they generate, and the mechanism they use to regulate the hydrogen. The mechanism employed can vary from linear action, plunger-type actuators to pivoted-armature actuators and rocker actuators. In some embodiments, the valves selected utilize a two-port design to regulate a flow, as can be the case with the output valve 18.

FIG. 3 is a schematic diagram illustrating the movement of hydrogen within the hydrogen management system 10 that corresponds to the schematic diagram of FIG. 1. In FIGS. 1 and 3, a solenoid valve is utilized as the output valve 18. FIG. 4 is a flow diagram illustrating the movement of hydrogen within the hydrogen management system 10 that corresponds to the schematic diagram of FIG. 4. In FIGS. 2 and 4, a port fuel injector is utilized as the output valve 18.

The hydrogen capture cannister 12 defines the chamber 22, which stores captured hydrogen at a pressures of from about 0.3 bar (0.03 MPa or about 4.4 PSI) to about 15 bar (1.5 MPa or about 218 PSI), or from about 0.3 bar (0.03 MPa or about 4.4 PSI) to about 10 bar (1.0 MPa or about 145 PSI). In many embodiments, the hydrogen capture cannister 12 includes a single chamber and the pressure sensor 16 monitors pressure within the chamber 22. However, some embodiments of the hydrogen capture cannister 12 include multiple chambers (e.g. 2, 3, 4, or more chambers) and/or multiple pressure sensors (e.g. 2, 3, 4, or more sensors). The chamber 22 can have a capacity of from about 0.3 to about 12 liters, or from about 0.5 to about 6 liters, depending on the particular application and/or vehicle. The hydrogen capture cannister 12 is constructed with materials that are able to contain hydrogen molecules, which can be difficult to contain due to their size. In various embodiments, the hydrogen capture cannister 12 can be formed from polymer (s), metal (e.g. steel, aluminum), aluminum with filament winding, and composite materials (e.g. carbon fiber, fiberglass/aramid fiber). In some embodiments, the hydrogen capture cannister 12 can have a body comprising molded or extruded polymers, with vibration, ultrasonic or laser welded ends and add-on ports or interfaces. In some embodiments, the hydrogen capture cannister 12 includes a polymeric liner. In other embodiments, the hydrogen capture cannister 12 is liner-less.

The hydrogen management system comprises a pressure sensor 16, which is configured to measure the HCC pressure within the chamber 22 of the hydrogen capture cannister 12. Pressure measurements from the pressure sensor 16, which is in communication with the controller 20 can be used to determine an output valve 18 (e.g. port fuel injector) duty cycle and discharge rate. Pressure measurements from the pressure sensor 16 ensure that the captured hydrogen is being returned through output valve 18 and that the chamber 22 of the hydrogen capture cannister is not leaking. The controller 20 can define when the PFI valve operates, based on pressure measurements from the pressure sensor (the amount of hydrogen in the hydrogen capture cannister) and combustion cycle information from the vehicle electronic control unit.

The hydrogen management system 10 comprises the input valve 14, which is configured to transfer residual hydrogen from the fuel supply infrastructure to the chamber 22 of the hydrogen capture cannister 12. More specifically, the input valve 14 is typically a solenoid valve that is configured to purge the hydrogen from the fuel supply infrastructure including the fuel line/hydrogen supply line 56 and fuel rail 54 of the internal combustion engine 50. To this end, the input valve 14 functions to transfer the hydrogen into the hydrogen capture cannister 12.

In one embodiment, the input valve 14 is a normally closed one-way solenoid valve, which could be a plunger type solenoid or any directly actuated valve suitable for a hydrogen environment as a standalone item or part of a pressure regulation system. The high-pressure vessel (in this example the fuel line/hydrogen supply line 56) will expand into the hydrogen capture cannister 12 (which is lower pressure). In turn, the captured hydrogen is released/emptied when the engine is running until equilibrium between the fuel line/hydrogen supply line 56 and the hydrogen capture cannister 12 is reached. Initial pressure in the fuel line/hydrogen supply line 56 may range from 20-40 bar, depending upon system pressure before engine shut off.

In some embodiments, the hydrogen management system 10 comprises a pressure relief valve 24. The pressure relief valve 24 is designed to release hydrogen if the pressure in the hydrogen capture cannister exceeds a maximum pressure level. In some specific embodiments, the pressure relief valve 24 is in electronic communication with the controller 20 and is activated when the pressure sensor 16 indicates that the HCC pressure within the chamber 22 of the hydrogen capture cannister 12 has exceeded a maximum pressure level. In some such embodiments, the pressure relief valve 24 is a solenoid valve. In other specific embodiments, the pressure relief valve 24 is not in electronic communication with the controller 20 and is designed to open if the pressure in the hydrogen capture cannister 12 exceeds a maximum pressure level. In some embodiments, the pressure relief valve 24 opens and safely releases the hydrogen contained in the chamber 22 of the hydrogen capture cannister 12, and remains open thereafter. In other embodiments, the pressure relief valve 24 opens and safely releases an amount of hydrogen sufficient to reduce the HCC pressure to a safe level and then closes. In some embodiments, the pressure relief valve 24 is configured to open when the HCC pressure in the chamber 22 of the hydrogen capture cannister 12 exceeds 8, 9, 10, 11, 12, 13, 14, or 15 bar.

In one embodiment, the pressure relief valve 24 is a mechanical pressure relief valve (e.g. a spring-loaded valve)

that is designed to open when the HCC pressure inside the hydrogen capture cannister 12 exceeds a maximum pressure level (e.g. reaches an unsafe threshold, which could lead to a burst event). In other words, in many embodiments, the pressure relief valve 24 is a safety mechanism/feature.

The hydrogen management system 10 comprises the output valve 18, which is configured to transfer hydrogen in the chamber 22 of the hydrogen capture cannister 12 to the internal combustion engine 50. In some embodiments, the output valve 18 is configured to meter captured hydrogen into the internal combustion engine 50 in accordance with metering instructions from the controller 20. The output valve 18 releases captured hydrogen into intake air that is used to fuel combustion within the internal combustion engine 50. As is described above with reference to FIGS. 1-4, the output valve 18 can be a solenoid valve or a port fuel injector. Further, output valve 18 is configured to maintain a hydrogen concentration of less than 4%, based on 100 parts by volume gaseous intake. In various embodiments, the output valve 18 is configured to maintain a hydrogen concentration from about 0.1 to 4%, based on 100 parts by volume gaseous intake. In some embodiments, the port fuel injector is configured for sequential port fuel injection.

In some embodiments, the output valve 18 is metering valve, actuated through a pulse-width modulation (PWM) signal based on the HCC pressure signal via controller from the pressure sensor 16. In such embodiments, the output valve 18 also includes a port fuel injector (normally closed) built with materials suitable for hydrogen exposure and capable to operate with pressures as low as 0.5 bar upon controller input. Of course, such a valve must be accurate enough to ensure a volume flow control with the duty cycle (T_on). The duty cycle is sometimes referred to as T_on. The duty cycle represents the pattern in time at which the output is high.

In some embodiments, the output valve 18 is similar to a gas injector. As such, the nominal injection flow rate when the output valve 18/injector is open is adjusted via the valve diameter. The flow rate (of the hydrogen) is a function of a delta in pressure between the hydrogen capture cannister 12 and where (e.g. an intake manifold) the hydrogen is delivered (critical flow condition). A frequency of actuation is selected to allow a smooth delivery of the hydrogen. The proper duty cycle can be determined to control the quantity of hydrogen delivered given a constraint (e.g. less than 4%).

Figure 5:
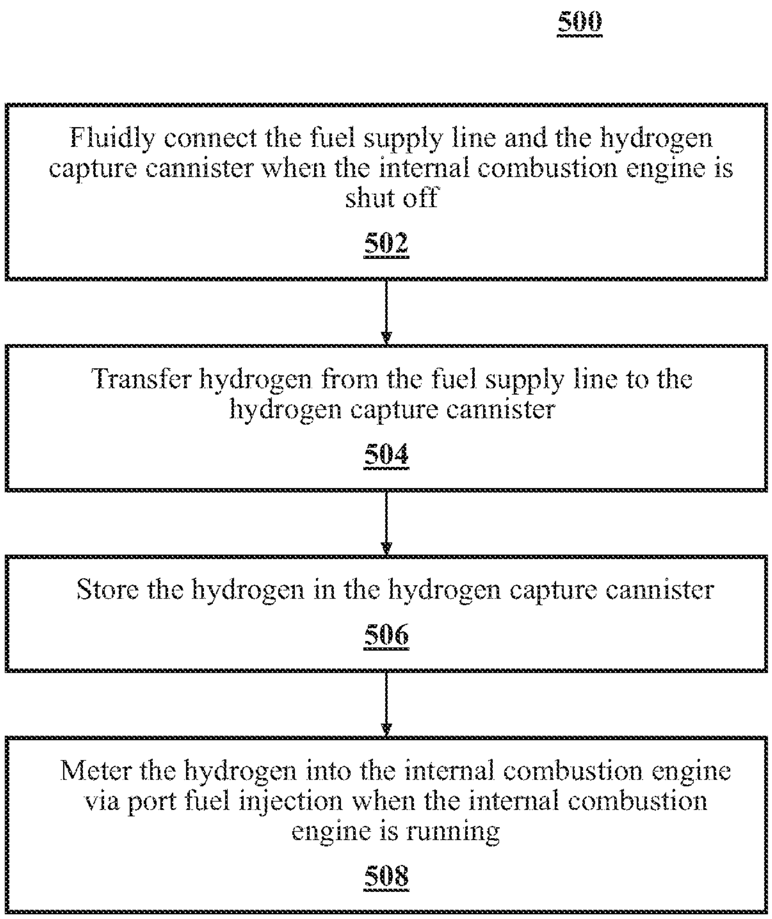
FIG. 5 is flowchart detailing a method of hydrogen management.

Referring now to FIG. 5, a method of hydrogen management in an internal combustion engine is disclosed at 500. The method 500 involves capturing residual hydrogen in a hydrogen supply line of the internal combustion engine and metering the captured hydrogen back into the internal combustion engine with a hydrogen management system. As is described above, the hydrogen management system comprises an input valve, a hydrogen capture cannister, a pressure sensor, a pressure relief valve, an output valve, and a controller. The method 500 includes the steps of fluidly connecting the hydrogen supply line and the hydrogen capture cannister when the internal combustion engine is shut off (502) and then transferring hydrogen from the hydrogen supply line to the hydrogen capture cannister (504). The captured hydrogen is stored in the hydrogen capture cannister (506). The method also includes the step of metering the captured hydrogen into the internal combustion engine via port fuel injection when the internal combustion engine is running (508). In a typical embodiment of the method 500, the controller is in electronic communication with the input valve, the pressure sensor, the output valve, and an engine control unit, and is configured to provide metering instructions to the output valve based on electronic communications with the engine control unit and the pressure sensor.

In one embodiment, the step of metering is conducted in accordance with metering instructions provided by the controller. Typically, the step of determining metering instructions is based on a pressure differential between a combustion pressure of the internal combustion engine and an HCC pressure of the hydrogen capture cannister, this ensures that the hydrogen is being released while the internal combustion engine is running and that the hydrogen is consumed. As is explained above, the step of metering can be further defined as injecting hydrogen into an intake manifold or a throttle valve at a concentration from about 0.1 to 4%, based on 100 parts by volume gaseous intake.

The method may also include the step of opening the pressure relief valve to release hydrogen from the hydrogen capture canister when an HCC pressure is greater than a pressure of from about 3 to about 15 bar. For example, the pressure relief valve can be opened when the HCC pressure in the chamber of the hydrogen capture cannister 12 exceeds 3, 4, 5, 6, 7, 8, 9, 10, 11, 12, 13, 14, or 15 bar. In turn, the method may include the step of closing the pressure relief valve when an HCC pressure is less than a pressure of from about 3 to about 15 bar. For example, the pressure relief valve can be closed when the HCC pressure in the chamber of the hydrogen capture cannister falls below 3, 4, 5, 6, 7, 8, 9, 10, 11, 12, 13, 14, or 15 bar.

As is touched on above, the hydrogen management system is for capturing residual hydrogen in a hydrogen supply line of a hydrogen utilizing apparatus and metering the captured hydrogen back into the hydrogen utilizing apparatus in many different applications and is not limited to use in an internal combustion engine in a vehicle. To this end, the hydrogen management system for capturing residual hydrogen in a hydrogen supply line of a hydrogen utilizing apparatus and metering the captured hydrogen back into the hydrogen utilizing apparatus can include the same components described above, but is just configured for a different apparatus. To this end, such a hydrogen management system comprises, as described above, the hydrogen capture cannister, the pressure sensor, the input valve, the output valve, and the controller. The hydrogen capture cannister defines a chamber. The pressure sensor monitors pressure within the chamber of the hydrogen capture cannister. The input valve is in fluidic communication with the hydrogen supply line and the chamber of the hydrogen capture cannister, and configured to transfer residual hydrogen from the hydrogen supply line to the chamber of the hydrogen capture cannister. The output valve is in fluidic communication with the chamber of the hydrogen capture cannister and the hydrogen consuming apparatus, the output valve configured to meter captured hydrogen into the hydrogen utilizing apparatus in accordance with metering instructions. The controller in electronic communication with the input valve, the pressure sensor, and the output valve, wherein the controller is configured to provide metering instructions to the output valve. In some such applications, the output valve may even be configured to simply release hydrogen into the atmosphere at safe levels.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A hydrogen management system for capturing residual hydrogen in a hydrogen supply line of an internal combustion engine and, in a parallel configuration with the hydrogen supply line, metering the captured hydrogen back into the internal combustion engine, the hydrogen management system comprising:

a hydrogen capture cannister defining a chamber;

a pressure sensor for measuring pressure within the chamber of the hydrogen capture cannister;

an input valve in fluidic communication with the hydrogen supply line and the chamber of the hydrogen capture cannister, the input valve configured to transfer residual hydrogen from the hydrogen supply line to the chamber of the hydrogen capture cannister;

an output valve in fluidic communication with the chamber of the hydrogen capture cannister and the internal combustion engine, the output valve configured to meter captured hydrogen into the internal combustion engine in accordance with metering instructions; and a controller in electronic communication with the input valve, the pressure sensor, the output valve, and an engine control unit, wherein the controller is configured to provide metering instructions to the output valve based on electronic communications with the engine control unit and the pressure sensor.

2. The hydrogen management system of claim 1, wherein the metering instructions are determined by a pressure differential between a combustion pressure of the internal combustion engine and an HCC pressure of the hydrogen capture cannister.

3. The hydrogen management system of claim 2, wherein the pressure differential is between a pressure of an intake manifold of the internal combustion engine and a pressure of the hydrogen capture cannister of the hydrogen management system.

4. The hydrogen management system of claim 2, wherein the pressure differential is between a pressure of a throttle valve of a turbocharger of the internal combustion engine and a pressure of the hydrogen capture cannister of the hydrogen capture cannister.

5. The hydrogen management system of claim 1, wherein the output valve is configured to maintain a hydrogen concentration from about 0.1 to 4%, based on 100 parts by volume gaseous intake.

6. The hydrogen management system of claim 1, wherein the output valve is a port fuel injector.

7. The hydrogen management system of claim 6, wherein the port fuel injector is configured to maintain a hydrogen concentration of less than 4%, based on 100 parts by volume gaseous intake.

8. The hydrogen management system of claim 1, wherein the hydrogen capture cannister has a body comprising metal, aramid fiber, and/or carbon fiber.

9. The hydrogen management system of claim 8, wherein the hydrogen capture cannister includes a polymeric liner.

10. The hydrogen management system of claim 1, wherein the chamber of the hydrogen capture cannister can store captured hydrogen at an HCC pressure of from about 2 to 15 bar.

11. The hydrogen management system of claim 1, wherein the chamber of the hydrogen capture cannister has a capacity of from about 0.3 to 6 liters.

12. The hydrogen management system of claim 1, further comprising a pressure relief valve.

13. The hydrogen management system of claim 12, wherein the pressure relief valve is configured to release hydrogen if an HCC pressure in the hydrogen capture canister is greater than a pressure of from about 3 to about 15 bar.

14. A method of capturing and residual hydrogen in a hydrogen supply line of an internal combustion engine and, in a parallel configuration with the hydrogen supply line, metering the captured hydrogen back into the internal combustion engine with a hydrogen management system comprising an input valve, a hydrogen capture cannister, a pressure sensor, a pressure relief valve, an output valve, and a controller, said method comprising the steps of:

fluidly connecting the hydrogen supply line and the hydrogen capture cannister when the internal combustion engine is shut off;

transferring hydrogen from the hydrogen supply line to the hydrogen capture cannister;

storing the hydrogen in the hydrogen capture cannister; and metering the hydrogen into the internal combustion engine via port fuel injection when the internal combustion engine is running;

wherein the controller is in electronic communication with the pressure sensor, the output valve, and an engine control unit, and is configured to provide metering instructions to the output valve based on electronic communications with the engine control unit and the pressure sensor.

15. The method of claim 14, wherein the step of metering is conducted in accordance with metering instructions provided by the controller.

16. The method of claim 14 further comprising the step of determining metering instructions based on a pressure differential between a combustion pressure of the internal combustion engine and an HCC pressure of the hydrogen capture cannister.

17. The method of claim 14, wherein the step of metering is further defined as injecting hydrogen into an intake manifold or a throttle valve at a concentration from about 0.1 to 4%, based on 100 parts by volume gaseous intake.

18. The method of claim 14, further comprising the step of opening the pressure relief valve to release hydrogen from a chamber of the hydrogen capture canister when an HCC pressure is greater than a pressure of from about 3 to about 15 bar.

19. The method of claim 18, further comprising the step of closing the pressure relief valve when an HCC pressure in the chamber of the hydrogen capture canister is less than a pressure of from about 3 to about 15 bar.

20. A hydrogen management system for capturing residual hydrogen in a hydrogen supply line of a hydrogen utilizing apparatus and, in a parallel configuration with the hydrogen supply line, metering the captured hydrogen back into the hydrogen utilizing apparatus, the hydrogen management system comprising:

a hydrogen capture cannister defining a chamber;

a pressure sensor for measuring pressure within the chamber of the hydrogen capture cannister;

an input valve in fluidic communication with the hydrogen supply line and the chamber of the hydrogen capture cannister, the input valve configured to transfer residual hydrogen from the hydrogen supply line to the chamber of the hydrogen capture cannister;

an output valve in fluidic communication with the chamber of the hydrogen capture cannister and the hydrogen utilizing apparatus, the output valve configured to meter captured hydrogen into the hydrogen utilizing apparatus in accordance with metering instructions; and a controller in electronic communication with the input valve, the pressure sensor, and the output valve, wherein the controller is configured to provide metering instructions to the output valve.

* * * * *